Dec. 12, 1944.  R. E. PIXLER  2,364,813
STOCK PUSHER
Filed Nov. 20, 1943  2 Sheets-Sheet 1

Inventor
RALPH E. PIXLER
BY
Carl Benst
HIS Attorney

Dec. 12, 1944.   R. E. PIXLER   2,364,813
STOCK PUSHER
Filed Nov. 20, 1943   2 Sheets-Sheet 2
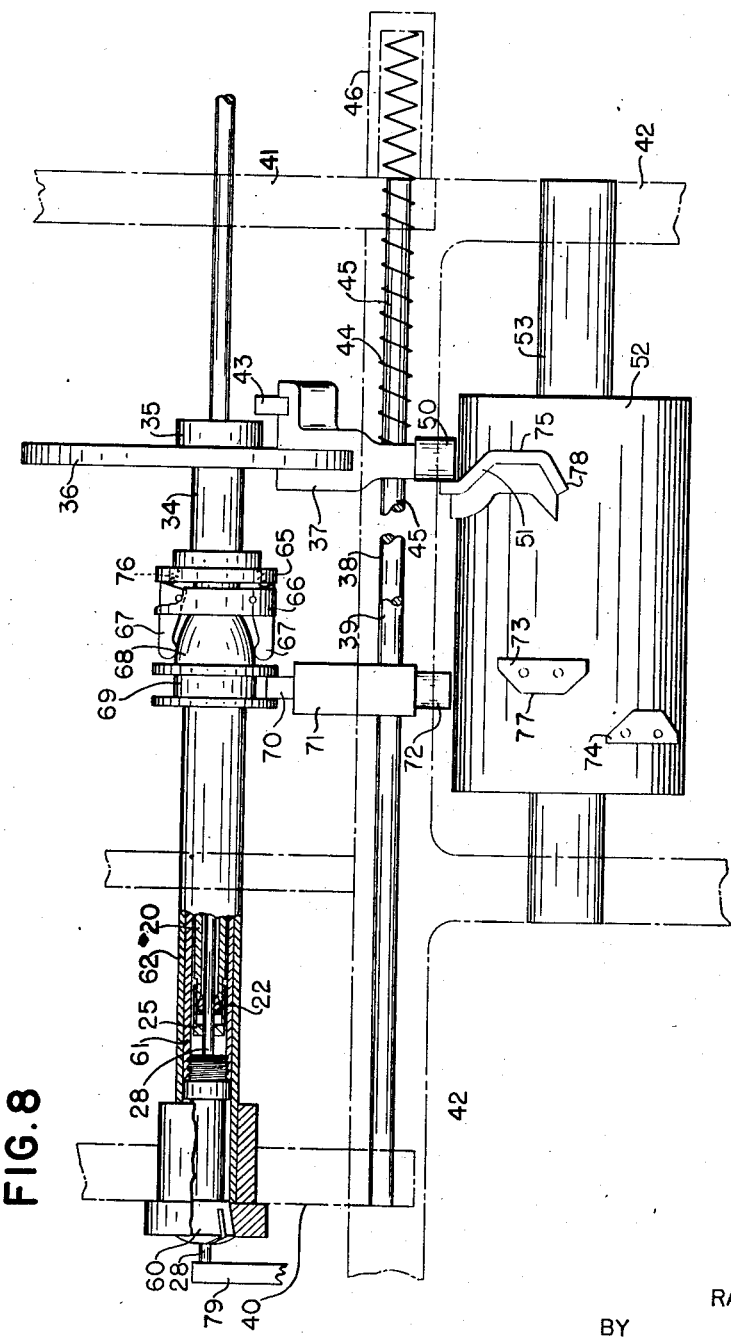
Inventor
RALPH E. PIXLER
BY
Carl Benst
HIS Attorney Patented Dec. 12, 1944

2,364,813

UNITED STATES PATENT OFFICE 2,364,813

STOCK PUSHER

Ralph E. Pixler, Dayton, Ohio

Application November 20, 1943, Serial No. 511,005

2 Claims. (Cl. 29—62)

This invention is a continuation-in-part of an application filed by me on March 13, 1943, Serial No. 478,992.

This invention relates to improvements in lathes or screw machines of the single or multiple spindle type, and more particularly to the means for feeding or pushing raw stock into the collet or chuck, after the same has been opened, and against the stop, to be worked upon by any of the various tools, such as form cutters, drills, threading tools, etc., depending upon the type of work necessary for any particular or specific job.

Specifically, the invention is an improvement in the stock pusher, which, as is well known in the art, is in the form of a cylindrical gripper which is usually threaded into a pusher tube. This pusher tube is provided with a collar, or pusher tube spool, which is operated by the stock feed slide, which in turn is operated by the usual drum cam and a spring, so that stock is fed into position, after the collet has been opened, up against the stop.

This type of stock feeding device is quite common in single and multiple spindle automatic screw machines and also in hand screw machines, and it is not the intention to limit the invention to either type, as it is susceptible of use both in automatic screw machines having a variable number of spindles and in hand screw machines.

In the machines on the market, the stock pusher is made in a single piece and is necessarily of high-grade steel in order to withstand wear. These standard pushers are slotted substantially halfway down the length to form gripping jaws, and this slotted end of the pusher is tempered, so as to have the right amount of resiliency or springiness, so that it can vary slightly according to the variations of the raw stock as it is forced through the pusher on the initial loading. Then, when it is time for the stock to be fed, the pusher is drawn back over the stock, after which it is moved forward, and, on this forward movement, the jaws of the pusher grip the stock and feed it into the open collet against the stop.

As the pusher is drawn back over the stock prior to feeding the stock, if the stock has uneven places on it, which is often the case, or if the raw stock happens to be of slightly larger diameter in spots, considerable strain is placed on the jaws of the pusher, and the pusher often cracks near the bottom of the slot which forms the jaw, due to these uneven places in the stock.

Then, again, the jaw end becomes worn, and the pushers have to be taken out of the machine, annealed, and reslotted (or, rather, the slot has to be opened up), and then they are again hardened and drawn to the proper temper. In fact, the wear and breakage on these pushers become a very expensive item of maintenance.

It is, therefore, an object of this invention to provide a stock pusher designed to eliminate the breakage and wear above mentioned.

It is a further object of this invention to provide a novel stock pusher which can be used in lathes of various types, automatic screw machines, and hand screw machines; and which is so designed that enlarged sections or unevenness of the raw stock are readily compensated for by the provision of slidable stock pusher jaws or grippers.

Another object of the invention is to provide a novel stock pusher with adjustable and removable pusher jaws or grippers.

Another object of this invention is to provide a novel stock pusher, for lathes or screw machines, with spring-pressed removable jaws.

A still further object of this invention is the provision of a novel stock pusher for screw machines, so constructed as to reduce wear to a minimum and to prevent breakage.

A further object of this invention is the provision of a novel stock pusher so constructed that only a comparatively very small portion thereof need be made from high-grade, expensive steel, thus reducing the cost of the article itself and the machine maintenance cost.

Another object of this invention is the provision of a novel stock pusher adapted to receive stock pusher jaws or grippers of variable sizes, whereby raw stock of different diameters may be fed into position in lathes and screw machines without the necessity of providing a complete stock pusher for each different size of raw stock, as is now necessary in machines on the market.

A further object of this invention is the provision of a novel stock pusher having a retaining device for said jaws arranged to be adjusted and locked in such adjusted position and being constructed to prevent any tendency of the pusher from spreading at the end thereof due to pressure of the wedging of the jaws.

A further object is to provide a retainer cap for the jaws, having perforations therein for the release of sludge and other foreign elements which collect at the end of the jaws during the continuous operation of the pusher.

With these and incidental objects in view, the invention consists of certain novel features of construction and combinations of parts, the essential elements of which are set forth in appended claims and a preferred form and a modified form of embodiment of which are hereinafter described with reference to the drawings which accompany and form a part of this specification.

Figure 6:
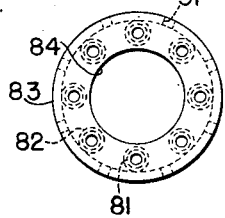
Figure 7:
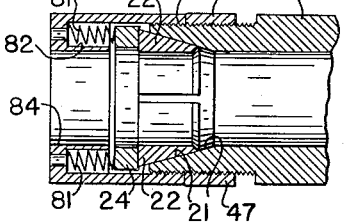

Figs. 6 and 7 disclose a modified form of the invention, Fig. 6 being an end view and Fig. 7 being a fragmentary sectional view through the center of the modified form of stock pusher.

Fig. 8 shows, in reduced scale, one spindle and the novel stock pusher in position in the machine, relative to the chuck which holds the raw stock while it is being worked on, and also shows the operating means for the chuck and the stock pusher.

General description

Described in general terms, this invention includes a novel stock pusher for lathes, automatic screw machines, or hand screw machines. This pusher is designed to fit into the standard pusher tubes and is provided with a pair of pusher jaws or grippers which operate on a tapered surface within the pusher. These jaws are held in position in the tapered section by a compression spring, which in turn is held in position by a cap screwed onto the end of the pusher. The inside diameter of the pair of pusher jaws or grippers is of a size to suit the particular diameter of raw stock which is being used and worked upon in the machine.

These pusher jaws may be made with variable inside diameters, all having the same tapered outside diameters, so that they are interchangeable and thus provide an inexpensive means of fitting the stock pusher to handle or feed stock of various diameters at a much lesser expense than can be done with the pushers now on the market.

The screw cap retainer for the jaws also aids in maintaining the end of the pusher in its normal position; that is, the cap, being threaded on the outside of the end of the pusher, prevents any spreading or flaring of this end of the pusher due to the outward pressure against the tapered jaw surfaces when the jaws are forced towards their gripping position when the pusher is moved in a stock feeding direction. This construction also causes the jaws to always firmly grip the stock, whereas, if the jaw retainer were in the form of a plug—that is, if threaded on the inside of the pusher—the constant pressure of the jaws would have a tendency to spread the end of the pusher, which would allow the retainer to become loose and eventually be pushed out of the end of the pusher, due to the fact that the threads of a plug retainer would not have the same holding power when the plug had become loose.

The screw cap construction makes it very easy to change the jaws whenever it is desired to change the diameter of the stock to be worked upon in the machine.

The washer intermediate the jaws and the spring provides for a more even distribution of pressure to the jaws.

These spring-pressed pusher jaws eliminate breakage of the pushers as the pusher is moved back on the stock prior to gripping the stock, because, if there are any inaccuracies, such as larger diameter sections of the stock or little bumps or ridges on the stock, which often occur, as the pusher is moved back on the stock, the pusher jaws will compress the spring and slide outwardly on the tapered section or surface of the pusher and slide over these irregular sections of the stock, thus, as above stated, preventing excessive wear and, in many cases, breakage of the pusher. Then, as the pusher is moved forward, the pusher jaws tend to move toward the smaller end of the taper and firmly grip the stock, so that there will be no slippage, with the result that the stock is always fed through the open collet to the stop.

In the past, with the use of the old type of pusher, the pusher would sometimes slip on the stock, with the consequent result that the stock would not always be pushed all the way up to the stop, and the manufactured part would therefore be too short and would have to be thrown away, as it would not pass inspection.

In the standard lathes or screw machines, this stock pusher, as has been stated above, is mounted in a pusher tube, which has secured to it a pusher spool, which is acted upon by a stock feed slide, which in turn is driven by a drum cam. In the present machines, this stock feed slide, which also is an expensive part of a machine to replace, becomes worn on excessive amount in a comparatively very short time, due to the fact that, with the old type of pusher, when the pusher is moved back on the stock, there is not enough resiliency in the jaws thereof, and consequently a great deal of friction has to be overcome by the stock feed slide as it pushes against the spool to move the pusher tube of the stock pusher back on the stock prior to feeding the stock forward.

With the present invention, this friction is reduced to a negligible amount because of the novel construction of the pusher tube. In other words, when the pusher tube is moved back on the stock by the stock feed slide, the pusher jaws or grippers will compress the spring under the cap, thus eliminating any drag or friction between the pusher jaws and the stock, and consequently the stock feed slide, having less work to do and no friction or drag to overcome, will have a considerably longer life, due to the lesser amount of wear on the same by the spool on the stock pusher.

Detailed description

Figure 1:
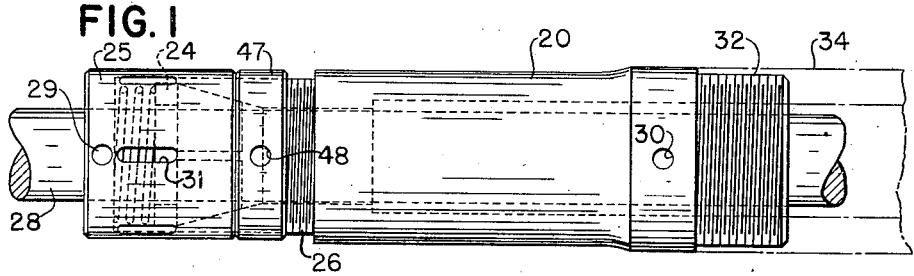
Fig. 1 is an assembled general view of the novel stock pusher, showing a portion of a piece of raw stock therein, a fragmentary section of a stock pusher tube being shown in dot-and-dash lines.
Figure 2:
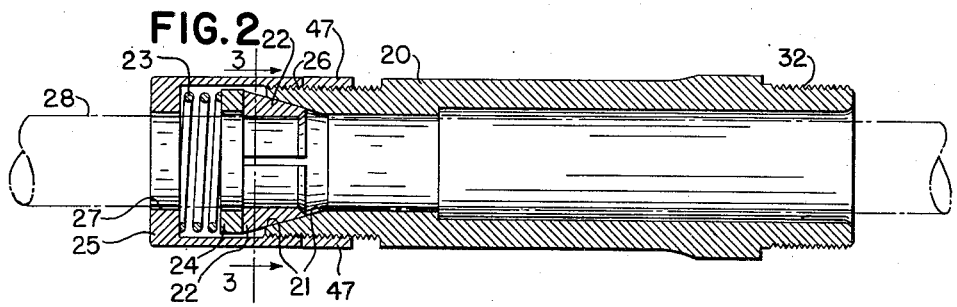
Fig. 2 is a section through the center of the stock pusher and shows, by dot-and-dash lines, a piece of stock.

In Fig. 1 is shown an assembled view of the stock pusher, in Fig. 2 is shown a section through the center of the stock pusher, and in Fig. 8 the stock pusher is shown assembled in the machine. The pusher consists of a sleeve 20 having a tapered section 21 to receive a pair of pusher jaws or grippers 22 held in contact with the tapered section by a compression spring 23, compressed against a washer 24 which is held against the top surface of the jaws 22. A retaining screw cap 25, which screws onto a threaded section 26 of the sleeve 20, holds the jaws 22, the washer 24, and the spring 23 in proper relations to each other and to the tapered section 21 at all times. This cap 25 is provided with a hole 27 sufficiently large for a piece of stock 28 to pass through. The jaws 22 are ground with a taper to fit the tapered section 21 of the sleeve 20 to insure proper gripping of the stock to feed the same.

A spanner wrench hole 29 is provided in the cap 25, and a spanner wrench hole 30 is provided in the sleeve 20, so that the sleeve 20 may be tightly screwed onto the tube 34. A locking collar 47 is screwed onto the threaded section 26 of the sleeve 20 and may be adjusted into various positions on the threaded section 26 of the sleeve 20 to vary the tension of the spring 23 and thereby vary the gripping action of the jaws 22 and also prevent any noticeable lagging of the jaws when they are released from the stock bar when the sleeve 20 is moved to the right preparatory to feeding the stock. Holes 48 are provided for holding the collar by a wrench or other tool when tightening the collar 25 against it.

Figure 3:
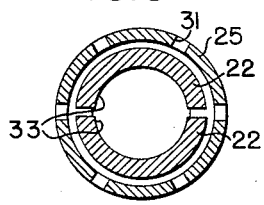
Fig. 3 is a section on line 3—3 of Fig. 2, looking in the direction of the arrows.
Figure 4:
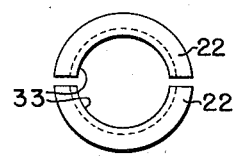
Fig. 4 shows a plan view of a pair of the pusher jaws or grippers.
Figure 5:
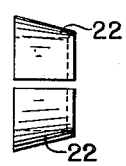
Fig. 5 is an edge view of said pusher jaws.

The cap is also provided with perforations 31 (Figs. 1 and 3) so that dirt and any small chips which may be scraped off of the stock can be thrown out of these slots by centrifugal force while the machine is in operation. These perforations 31 may be in the form of slots, as shown, or they may be in the form of a series of drilled holes around the cap 25. By their presence, foreign elements are eliminated from the inside of the pusher and therefore do not have any tendency to clog in the spring 23 and prevent its normal functioning, which may occur if such foreign matter was not eliminated through the perforations 31.

The inside diameter (designated 33) of the pusher jaws is made to conform with the size of stock to be used for any particular job.

These pusher jaws 22 may also be made with smaller or larger diameter sections 33, and, as they are readily interchangeable, one pusher sleeeve 20 may accommodate many different sizes of pusher jaws and thus handle or feed many different sizes of stock, designated as 28.

Due to the construction of the jaws 22 and the sleeve 20, the stock 28 is always fed up against the stock stop, thus eliminating the manufacture of "short" pieces which will not pass inspection and necessarily have to be scrapped.

The right end of the sleeve 20 (Figs. 1 and 2) is provided with threads 32 of a standard size, so that the pusher sleeve 20 may be screwed into a standard lathe or screw machine pusher tube 34, shown in Fig. 8, and in dot-and-dash lines in Fig. 1.

The right end of the pusher tube 34 (as viewed in Fig. 8) carries a pusher tube spool 35, which cooperates with the side of a feed ring 36 carried by a stock feed slide 37, which slides on a pair of rods 38 and 39 mounted in frames 40 and 41 secured to a base 42 of the lathe or screw machine.

A block 43 is carried by the stock feed slide 37, to cooperate with the pusher tube spool 35 to move said spool 35 and tube 34 under the influence of a spring 44 surrounding a rod 45 and held thereon by a cap 46. The rod 45 is carried by the frames 40 and 41 and projects through an opening in the slide 37, and the end of the spring 44 bears against the side of the slide 37.

The slide 37 carries a roller 50 cooperating with a stock feed cam 51 carried by the usual drum 52 rotatably driven in the usual well-known manner (not shown). A shaft 53 supports the drum 52.

The raw stock 28 is initially hand-inserted (from the right end as viewed in Fig. 8) through the pusher tube 34 and the sleeve 20, then between the feed jaws 22 and into a chuck or collet 60, which is screwed into one end of a collet tube 61 surrounding the pusher sleeve 20. The collet tube 61 is inside a spindle 62. The tube 61, the collet 60, and the spindle 62 are rotatably driven in the usual manner by means not shown. Secured to the collet tube 61 is a finger holder disk 65, with which cooperates a finger holder 66 having fingers 67 cooperating with a tapered end 68 of a chuck-operating spool 69 freely mounted on the spindle 62.

Cooperating with the chuck-operating spool 69 is a lug 70 of a chuck-operating slide 71 slidably mounted on the rods 38 and 39. The slide 71 carries a roller 72 to cooperate with a chuck-opening cam 73 and a chuck-closing cam 74, both of which are secured to and are operated by the drum 52.

After a finished article (not shown) has been cut off the raw stock 28, the drum 52, moving in the direction of the arrow, causes the cam 51 to move the slide 37 to the right, thus compressing the spring 44. The ring 36, through the pusher spool 35 and the tube 34, moves the stock pusher sleeve 20 to the right, and the feed jaws slide over the stock 28 due to the angular relation between the jaws and the sleeve 20. The spring 23 is slightly compressed by the washer 24 during this movement of the jaws 22.

After the pusher sleeve 20 is in such position and so held by a dwell 75 on the cam 51, the chuck-opening cam 73, through the slide 71, moves the spool 69 to the left, whereupon springs 76 (only one shown) rock the left ends of the fingers 67 toward the center of the spindle due to the taper end 68 of the spool 69, and the finger holder disk 65, the collet tube 61, and the collet or chuck 60 are moved slightly to the left and the chuck 60 is thus sprung open enough to permit free movement of the raw stock therethrough.

The chuck 60 is held open by a dwell 77 on the cam 73 until a section 78 of the cam 51 presents itself to the roller 50, whereupon the spring 44 moves the slide 37 to the left, back to the position shown. When this occurs, the block 43 moves the pusher spool 35, the tube 34, and the pusher sleeve 20 to the left (to the position shown), during which movement the pusher jaws 22 firmly grip the stock 28 and feed it up against a stop 79, which has been moved up in stopping position.

After such movement of the stock 28 by the pusher jaws 22, the chuck-closing cam 74 contacts the roll 72 and moves the slide 71 to the right (to the position shown), thus causing the taper end 68 of the spool 69 to rock the fingers 67 to normal positions (here shown), whereupon they move the disk 65, the collet tube 61, and the collet or chuck 60 to the right (to the positions shown), whereby the chuck firmly grips the stock 28 to turn the latter so that it can be worked upon by various tools (not shown) to manufacture any desired article.

*Modified form*

Figs. 6 and 7 show a modified form of the novel stock pusher, and parts which are identical will be given the same reference numbers as in the preferred form.

The sleeve 20 is provided with the tapered section 21, and a pair of jaws 22 are held in contact with the tapered section 21 by a washer 24 under the tension of a plurality of compression springs 81, which are supported in counter-bored openings 82 of a cap 83, which is screwed onto the threaded section 26 of the pusher sleeve 20. This cap 43 has perforations 31 to eliminate foreign matter from the springs 81 and is provided with a hole 84 in its end, sufficiently large to accommodate any stock being acted upon by the pusher. The cap 83 is adjustable to vary the tensions of the springs 81 by changing the position of the adjustable locking collar 47 in the manner above described, to vary the pressure of the jaws in the taper section 21.

The only difference between the modified form and the preferred from is the provision of the plurality of compression springs 81 instead of the single compression spring 23.

When the sleeve 20 is moved back on the stock prior to the feeding of the stock, the jaws 22, if they encounter any enlarged portions of the stock, will be moved to the left, thus moving the washer 24 to the left and compressing the springs 81 to eliminate friction in exactly the same manner and for the same purposes as described above in connection with the preferred form of the invention.

When the sleeve 20 is moved to the left, as viewed in Fig. 7, to feed the stock through the opened collet 60 against the stop 79, the jaws 22 tend to move toward the smaller end of the tapered section 21, and consequently they firmly grip the stock so that it is fed the proper distance, whereby it always reaches the stop 79, which prevents the manufacture of "short" pieces, thus eliminating waste.

While the forms of the invention herein shown and described are admirably adapted to fulfill the objects primarily stated, it is to be understood that it is not intended to confine the invention to the forms or embodiments shown, for it is susceptible of embodiment in various other forms all coming within the scope of the claims which follow.

What is claimed is:

1. In a device of the class described, the combination of a hollow cylindrical member having one end attached to a reciprocatory means and having an outside threaded section on the other end; a tapered internal surface on said member extending inwardly from said other end of said member; a plurality of devices having tapered outer walls to cooperate with said tapered surfaces, to grip and feed raw stock when said means is moved in one direction and to slide over the raw stock when said means is moved in another direction; a pressure collar adjacent the large ends of said devices; resilient means cooperating with said collar; and a retaining member hollowed out to house said collar and resilient means and having internal threads to hold said retaining member on said other end of the cylindrical member to maintain pressure of said collar adjacent said devices and prevent spreading of the tapered end of said cylindrical member when said devices are forced against the tapered surface thereof during feeding movement of the cylindrical member, said retaining member having perforations in the side thereof so that foreign elements which gather in the retaining member during operations of the cylindrical member may be emitted therefrom during such operations.

2. In a device of the class described, the combination of a hollow cylindrical member having one end attached to a reciprocatory means and having an outside threaded section on the other end; a tapered internal surface on said member extending inwardly from said other end of said member; a plurality of devices having tapered outer walls to cooperate with said tapered surfaces, to grip and feed raw stock when said means is moved in one direction and to slide over the raw stock when said means is moved in another direction; a pressure collar adjacent the large ends of said devices; resilient means cooperating with said collar; a retaining member hollowed out to house said collar and resilient means and having internal threads to hold said retaining member on said other end of the cylindrical member to maintain pressure of said collar adjacent said devices and prevent spreading of the tapered end of said cylindrical member when said devices are forced against the tapered surface thereof during feeding movement of the cylindrical member, said retaining member having perforations in the side thereof so that foreign elements which gather in the retaining member during operations of the cylindrical member may be emitted therefrom during such operations; and an adjustable locking member threaded on said other end of the cylindrical member ahead of said retaining member to act as an adjustable stop and lock for said retaining member to vary the pressure of the resilient means against the pressure collar.

RALPH E. PIXLER.